Jan. 29, 1974 B. A. UNGER 3,788,911

MANUFACTURE AND TESTING OF THIN FILM CIRCUITRY

Original Filed Dec. 21, 1970 2 Sheets-Sheet 1

Jan. 29, 1974 B. A. UNGER 3,788,911

MANUFACTURE AND TESTING OF THIN FILM CIRCUITRY

Original Filed Dec. 21, 1970 2 Sheets-Sheet 2

United States Patent Office 3,788,911

Patented Jan. 29, 1974

3,788,911

MANUFACTURE AND TESTING OF THIN FILM CIRCUITRY

Burton Abram Unger, Berkeley Heights, N.J., assignor to Bell Telephone Laboratories, Incorporated, Murray Hill, N.J.

Continuation-in-part of application Ser. No. 99,998, Dec. 21, 1970, now Patent No. 3,740,819. This application Dec. 3, 1971, Ser. No. 204,646

Int. Cl. H01l 7/00

U.S. Cl. 156—3 3 Claims

ABSTRACT OF THE DISCLOSURE

The procedure of testing the crossover points for short circuits, in thin film circuitry containing large numbers of air isolated crossovers, is simplified by providing temporary thin film interconnections to combine discrete conductive paths into a smaller number of paths none of which contains a crossover bridge and a crossunder conductor from the same crossover point, so that many crossovers can be tested simultaneously. The interconnection may be accomplished by providing that portions of a titanium layer, used as a means for bonding the circuitry to the substrate, are also established at the areas required for the interconnection. The temporary interconnection is removed, as by etching, after the testing is performed.

RELATED APPLICATION

This application is a continuation-in-part of application Ser. No. 99,998 of D. Babusci and B. A. Unger filed Dec. 21, 1970, now Pat. No. 3,740,819.

BACKGROUND OF THE INVENTION

(1) Field of the invention

This invention relates to methods of producing thin film electrical circuitry, containing crossovers, in such manner as to facilitate testing of the crossovers for short circuits.

(2) Summary of prior art

As thin film circuitry on insulating substrates has become more complex, the required number of crossovers (such as the air isolated beam crossovers described in U.S. Pat. 3,461,524, issued Aug. 19, 1969 to Lepselter) has increased, sometimes amounting to hundreds or even thousands on a single substrate. The possibility of the occurrence of short circuits in some of these tiny crossovers, which have extremely small clearances between crossover beam or bridge and crossunder conductor, is such that they must be tested to insure freedom of the circuitry from such defects. Testing of crossovers individually, as has been the practice, becomes exceedingly burdensome and uneconomic when such large numbers are involved.

SUMMARY OF THE INVENTION

Such testing is simplified according to the present invention, for patterns of thin film circuitry made up of a plurality of discrete conductive paths, by forming upon the insulating substrate a temporary conductor pattern interconnecting these discrete paths into a smaller number of combined paths, none of which contains a crossover bridge and a crossunder conductor at the same crossover point. By establishing a test voltage across each commuted pair of said combined paths, the presence or absence of crossover short circuits can be detected by testing across a greatly reduced number of probe points. If the entire pattern is found to be free of short circuits, the temporary conductor pattern can be removed and the thin film circuit accepted for its intended use. If short circuits exist in one or more of the pairs of paths tested but not in others, the location of the defective crossovers will be determined to this extent. Thereafter the crossovers in the paths found defective can be individually tested, and the defective crossovers repaired, or the circuitry can be discarded, depending upon the yields obtained and other economic factors. Alternatively the entire circuit board, or selected portions containing the defective areas, can be subjected to the action of rapidly evolved gas within a liquid under the crossover bridges so as to bow them upward to break short circuiting columns and to flush out conductive debris. This can be accomplished, for instance, by adding acetic acid to an aqueous slurry of a bicarbonate which has penetrated under the bridges, as described in more detail in application Ser. No. 99,998, filed Dec. 21, 1970 now U.S. Pat. 3,740,819, issued June 26, 1973. After treatment in this manner, the circuitry can again be tested as described above to determine whether the short circuits have been eliminated.

It will be appreciated that, although the possible presence of short circuits at the crossovers represents the greater threat to the integrity of the circuitry, there may be occasions upon which it is desirable to test for the continuity of the discrete conductive paths. This testing can also be done by taking advantage of the smaller number of longer combined series paths established by the temporary interconnection of the discrete paths and by making conventional continuity tests between the ends of such combined series paths.

The establishing of the temporary conductor pattern of interconnection can most suitably be carried out as a part of the deposition of one of the metal films normally deposited in the usual production of the thin film circuit. The removal of this temporary pattern can most effectively be carried out by an etching operation after the testing has been performed.

It has been found that the metal film used as a bonding layer for bonding gold circuitry to the substrate, ordinarily a titanium film, is particularly useful for defining the temporary interconnection.

DETAILED DESCRIPTION

The process of the present invention will be described, by way of illustration, in terms of the production and testing of thin film circuitry made up primarily of a pattern of deposited gold conductors containing thin film resistors and containing air isolated crossovers. The coated substrates resulting from the successive steps are illustrated in FIGS. 1 to 7 for a small portion of such circuitry containing a single crossover point.

As a first step in the production of such circuitry, an appropriate insulating substrate 11, such as a sheet of alumina ceramic or of glass, is coated with a layer of electrically resistive material 12, such as tantalum nitride, as by reactive sputtering of a tantalum cathode in a nitrogen-containing atmosphere by known techniques, as described for instance in U.S. Pat. 3,242,006, issued Mar. 22, 1966 to Gerstenberg.

Figure 1:
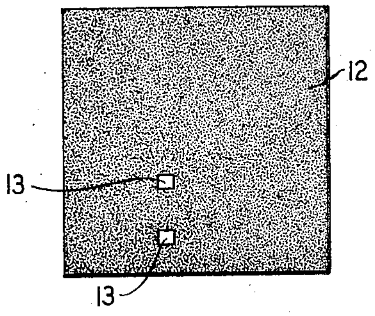
FIGS. 1 to 7 are plan views of a crossover region of a thin film circuit after successive steps in the production and testing of such circuitry according to the present invention.

In the regions where the thin film resistors are to be terminated, terminal pads 13 are deposited, as by evaporating through a mask successive layers of titanium and palladium and, if desired, a final layer of gold. Although these pads may be of the same composition as the conductive circuitry later applied, it is desirable that they be applied at the resistor terminals at this earlier stage in the process since the subsequent etching of the resistive film introduces the possibility of a surface change of the resistive film which can interfere with the establishing of a noise-free electrical contact between the film and the pads. The resulting coated substrate is illustrated in FIG. 1.

Figure 2:
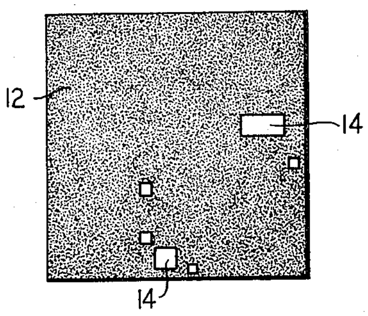

Thereafter, using a photoresist mask in the known manner and known etch such as an aqueous hydrofluoric nitric acid mixture, windows 14 are etched in the resistive layer 12, exposing the insulating substrate in those areas upon which the temporary interconnection patterns are to be deposited, as shown in FIG. 2.

Figure 3:
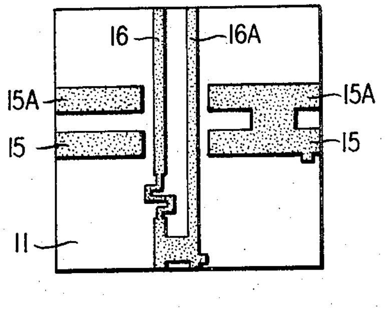
Figure 4:
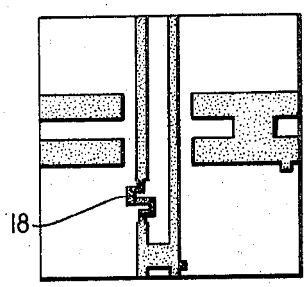

A succession of metal layers is next applied over the windows 14 and over the areas representing the pattern of four permanent discrete conductive paths 15, 15A, 16, 16A (including any thin film resistors but not crossover bridges), as shown in FIGS. 3 and 4. The first of such layers is a meltal, such as titanium, which promotes adhesion of the later deposited layers to the underlying material, whether the resistive film or the insulating substrate. Gold is the preferred material deposited as the primary conductive material of the pattern; it may be deposited directly over the adhesion promoting layer but, where titanium is used, preferably an intermediate layer of platinum or palladium is deposited to reduce undesirable interdiffusion between the titanium and the gold. Deposition may be by evaporation through a mask by techniques and to thicknesses known in the art. The resistive layer 12 is then etched away from areas not covered by the succession of metal layers by means of a known etch, such as an aqueous solution of hydrofluoric and nitric acids, which attacks the resistive layer but not the other metals, leaving the insulating substrate exposed in these areas. FIG. 3 illustrates the coated substrate at this point.

Next, the thin film resistors 18 are exposed by etching away all metal layers over the resistive layer in the areas of the resistors, leaving the result shown in FIG. 4. Known photoengraving techniques and known etches can be used, as, for instance an aqueous solution of potassium iodide and iodine for the gold and palladium layers and an aqueous solution of nitric and hydrofluoric acids for the titanium. These resistors can be trimmed to value and stabilized by anodization and baking as described, for instance in U.S. Pat. 3,159,556, issued Dec. 1, 1964.

Figure 5:
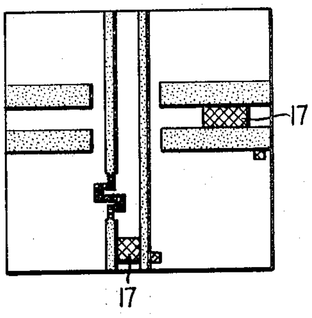

In the areas representing the temporary interconnection pattern, the metal layers over the adhesion promoting layer are then removed by known photoengraving techniques and known etches, as indicated above, so as to leave the areas 17 of adhesion promoting metal as the sole medium of temporary interconnection, as shown in FIG. 5.

Figure 6:
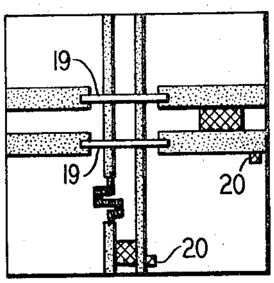

Crossover bridges 19 are next produced, isolated from crossunder conductors 16 and electrically connecting the respective portions of conductive paths 15, 15A as shown in FIG. 6. These crossover bridges may be produced by known techniques, as by depositing a spacer layer of copper directly upon an area of the crossunders 16 and substrate 11 extending between the gaps in paths 15 and 15A, depositing a layer of gold, constituting the bridge, over the copper spacer layer and in contact with the respective conductive regions of 15 and 15A, and then etching out the copper spacer to leave an air isolated gold bridge.

There now remains a completed pattern of a plurality of discrete conductive paths including crossovers but containing in addition a number of temporary interconnections 17 which are so arranged as to produce a smaller number of combined conductive paths none of which contains a crossover bridge and a crossover conductor at the same crossover point.

Thus in the circuit fragment shown in FIG. 6, the four discrete conductive paths 15, 15A, 16 and 16A are combined by the interconnections 17 into two paths 15–15A and 16–16A. A single test voltage applied between the two combined paths will indicate any short circuit existing between the two crossover bridges and the two crossunder conductors.

Figure 8:
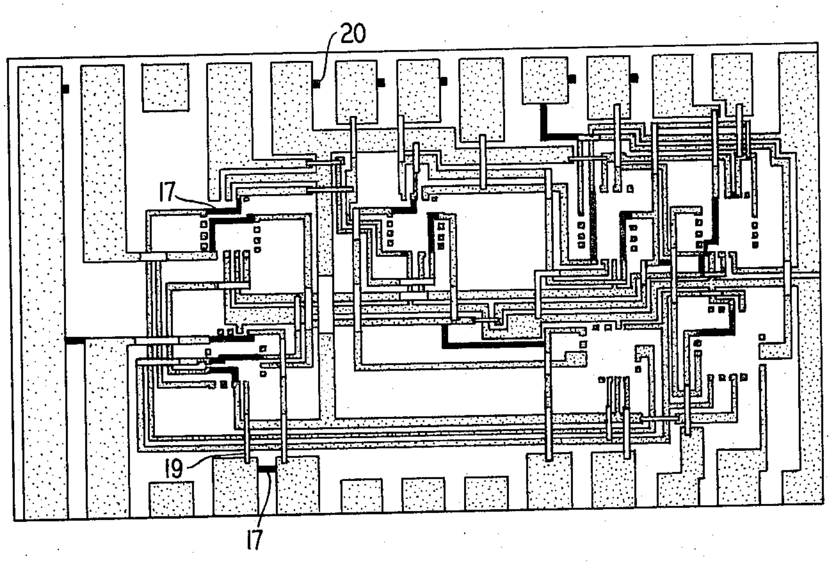
FIG. 8 is a plan view of a pattern of thin film circuitry at the point in its production when it contains the temporary interconnections and is ready for testing.

FIG. 8 shows a complete but relatively simple pattern of circuitry produced as described above except that it contains no thin film resistors, so that the steps shown in FIGS. 1, 2 and 5 can be omitted in its production. The circuit of FIG. 8 contains 44 crossover bridges and 88 crossunder paths, an arrangement which would require 132 test probings for the usual individual testing of crossovers. By means of the temporary interconnections, testing of all crossovers for short circuits can be accomplished with probings at 6 points, making it possible to test in less than 1 minute as opposed to the approximately 30 minutes required for individual manual testing.

Testing is carried out by placing a test voltage across each pair of the combined conductive paths and detecting any current flow between them which would indicate a short circuit. For convenience in testing, temporary indicator tabs 20 may be placed at some convenient point along each combined path to indicate where the test voltage is to be applied. These tabs may be applied and, if desired, removed at the same time and by the same technique as the temporary interconnections.

Figure 7:
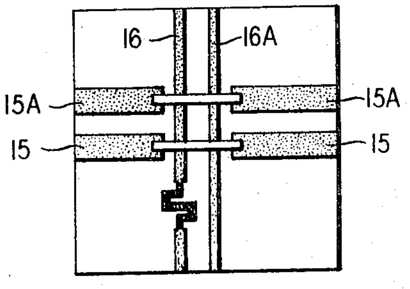
Figure 9:
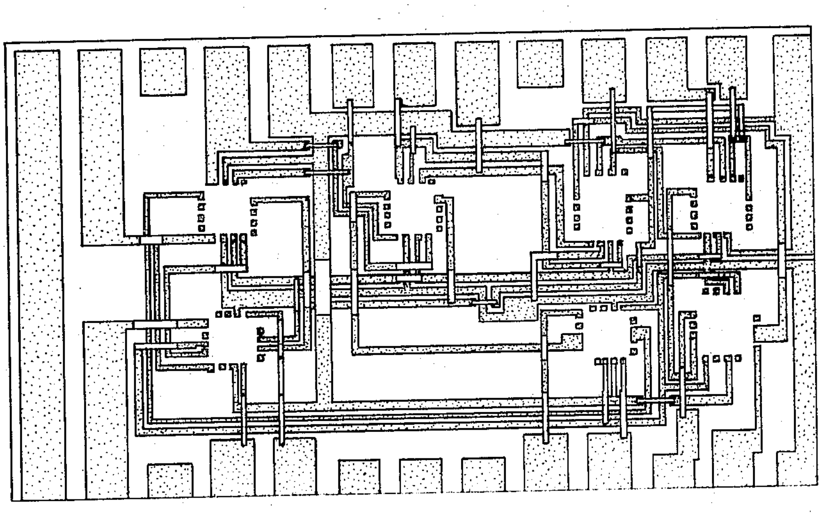
FIG. 9 is a plan view of the circuitry of FIG. 8 after the temporary interconnections have been removed.

After testing is completed, the temporary interconnections 17 can be removed in known manner, as by means of etches which attack the adhesion promoting metal but not the substrate or other exposed metals, or by masking and etching in known manner. The completed circuitry is shown in FIGS. 7 and 9.

What is claimed is:

1. The method of forming on an insulating substrate a pattern of thin film circuitry, made up of a plurality of discrete conductive paths which cross at a substantial number of points as crossover bridges insulated from crossunder conductors passing thereunder, and testing said pattern for short circuits at these crossover points, said method comprising forming on the substrate a composite layer in a configuration consisting of said pattern of circuitry and temporary conductive patterns interconnecting the discrete conductive paths into a smaller plurality of combined paths, none of which contains a crossover bridge and a crossunder conductor at the same crossover point, said composite layer comprising a primary conductive layer including a metal serving as the primary conductive material of said pattern of circuitry over a bonding layer of a metal which serves to promote adhesion of said primary conductive layer to the underlying material, etching said primary conductive layer from the temporary conductive patterns, leaving the bonding layer in these areas to serve as the temporary conductive pattern for testing, forming crossover bridges of said primary conductive material at said crossover points, applying a test voltage across each permuted pair of said combined paths to indicate any short circuit at the crossover points, and etching said temporary conductive patterns from said substrate so as to isolate electrically said discrete conductive paths.

2. The method of claim 1 wherein the bonding layer is formed of titanium and the primary conductive material is gold.

3. The method of forming on a ceramic substrate a pattern of thin film circuitry made up of a plurality of discrete conductive paths which cross at a substantial number of crossover points made up of conductive crossover bridges spaced from crossunder conductors passing thereunder, at least some of said paths containing thin film resistors, and testing said pattern for short circuits at the crossover points, said method comprising depositing a resistive layer of tantalum nitride on said substrate, etching tantalum nitride from those areas upon which are subsequently to be deposited temporary areas of metal film not forming part of said pattern but serving to interconnect the discrete conductive paths into a smaller plurality of combined paths, none of which contains a crossover bridge and a crossunder conductor at the same crossover point, forming over said temporary areas and over those areas, defining said discrete conductive paths except for the crossover bridges, successive deposited layers of titanium, palladium and gold, etching tantalum nitride from the areas of the substrate not coated with said successive layers, etching the gold and palladium layers from said temporary areas, leaving a layer of titanium directly on the ceramic substrate in these areas, etching the gold, palladium and titanium layers from those areas defining the thin film resistors, depositing a copper spacer layer over each area to be occupied by a crossover bridge, depositing a gold layer to serve as a crossover bridge over said copper spacers, etching away said copper spacers to leave air-isolated crossover bridges, applying a test voltage across each permuted pair of said combined paths to indicate any short circuit at the crossover points and then etching away the titanium in said temporary areas so as to separate electrically the discrete conductive paths.

References Cited

UNITED STATES PATENTS

| | | | |
|---|---|---|---|
| 3,553,830 | 1/1971 | Jenny et al. | 29—574 |
| 3,641,661 | 2/1972 | Canning et al. | 29—593 |
| 3,692,987 | 9/1972 | Bos | 235—151.31 |

WILLIAM A. POWELL, Primary Examiner

U.S. Cl. X.R.

29—574; 156—7, 17; 324—51, 52